(12) United States Patent
Ahuja et al.

(10) Patent No.: US 8,392,700 B2
(45) Date of Patent: *Mar. 5, 2013

(54) APPARATUS AND SYSTEM FOR ASYMMETRIC SECURITY

(75) Inventors: Pratima Ahuja, Foster City, CA (US); Manoj Khangaonkar, Foster City, CA (US); Kai Mike Zhang, Lake Oswego, OR (US)

(73) Assignee: International Business Machines Corporation, Armonk, NY (US)

( * ) Notice: Subject to any disclaimer, the term of this patent is extended or adjusted under 35 U.S.C. 154(b) by 780 days.

This patent is subject to a terminal disclaimer.

(21) Appl. No.: 12/167,204

(22) Filed: Jul. 2, 2008

(65) Prior Publication Data
US 2008/0285752 A1 Nov. 20, 2008

Related U.S. Application Data

(63) Continuation of application No. 10/948,000, filed on Sep. 23, 2004, now Pat. No. 7,607,006.

(51) Int. Cl.
*H04L 9/00* (2006.01)

(52) U.S. Cl. .......... 713/151; 713/150; 726/24; 709/220; 705/79

(58) Field of Classification Search .................. 380/255; 713/150, 151; 726/24; 709/237; 705/79
See application file for complete search history.

(56) References Cited

U.S. PATENT DOCUMENTS

| | | | |
|---|---|---|---|
| 5,602,916 A | 2/1997 | Grube et al. | |
| 5,615,261 A | 3/1997 | Grube et al. | |
| 5,699,523 A * | 12/1997 | Li et al. | 709/238 |
| 5,784,463 A | 7/1998 | Chen et al. | |
| 5,935,248 A * | 8/1999 | Kuroda | 726/14 |
| 5,940,187 A | 8/1999 | Berke | |
| 5,960,080 A * | 9/1999 | Fahlman et al. | 380/252 |
| 5,960,086 A | 9/1999 | Atalla | |
| 6,021,203 A | 2/2000 | Douceur et al. | |
| 6,108,583 A * | 8/2000 | Schneck et al. | 700/9 |
| 6,185,612 B1 | 2/2001 | Jensen et al. | |
| 6,490,679 B1 | 12/2002 | Tumblin et al. | |
| 6,567,913 B1 | 5/2003 | Ryan, Jr. | |
| 6,961,783 B1 * | 11/2005 | Cook et al. | 709/245 |
| 7,137,099 B2 | 11/2006 | Knight et al. | |
| 7,165,179 B2 | 1/2007 | Maruyama et al. | |

(Continued)

FOREIGN PATENT DOCUMENTS

EP 0409397 A2 1/1991

OTHER PUBLICATIONS

James Hart, IBM Software Group, "Connecting your applications without complex programming", WebSphere Software, Sep. 2003.

(Continued)

*Primary Examiner* — April Shan
(74) *Attorney, Agent, or Firm* — Kunzler Law Group, PC

(57) ABSTRACT

An apparatus and system are disclosed for asymmetric security in data communications between two or more nodes. Asymmetric security within data communications refers to sending and receiving messages at different security levels. The apparatus includes a receiving module, a transmission module, and a communication module. The receiving module receives a first message at a first security level from a first node. A security level may be defined by implementation of one or more security features, including encryption, digital signatures, and/or other security features. The transmission module transmits a second message at a second security level to the first node in response to receiving the first message. The first and second messages may be communicated during a single communication session. The communication module communicates the second security level to the first node. The communication may be directly between two nodes or may occur via a broker or other intermediate node.

20 Claims, 10 Drawing Sheets

U.S. PATENT DOCUMENTS

| | | | |
|---|---|---|---|
| 7,236,597 B2 | 6/2007 | Elliott et al. | |
| 7,257,843 B2 | 8/2007 | Fujita et al. | |
| 7,269,260 B2* | 9/2007 | Adachi et al. | 380/270 |
| 7,293,175 B2* | 11/2007 | Brown et al. | 713/166 |
| 7,296,260 B2 | 11/2007 | Wen et al. | |
| 7,350,212 B2 | 3/2008 | Lambert et al. | |
| 7,660,986 B1* | 2/2010 | Qiu et al. | 713/166 |
| 7,673,334 B2* | 3/2010 | Takemori et al. | 726/10 |
| 2001/0005883 A1 | 6/2001 | Wray et al. | |
| 2002/0073313 A1 | 6/2002 | Brown et al. | |
| 2002/0116619 A1 | 8/2002 | Maruyama et al. | |
| 2002/0123325 A1 | 9/2002 | Cooper | |
| 2002/0162024 A1* | 10/2002 | Cunchon et al. | 713/201 |
| 2003/0033349 A1 | 2/2003 | Lambert et al. | |
| 2003/0074579 A1 | 4/2003 | Della-Libera et al. | |
| 2003/0131245 A1 | 7/2003 | Linderman | |
| 2003/0172167 A1 | 9/2003 | Judge et al. | |
| 2004/0071137 A1 | 4/2004 | He et al. | |
| 2004/0078334 A1 | 4/2004 | Malcolm et al. | |
| 2004/0139312 A1* | 7/2004 | Medvinsky | 713/150 |
| 2004/0139314 A1* | 7/2004 | Cook et al. | 713/151 |
| 2004/0223615 A1 | 11/2004 | Dhawan | |
| 2005/0015592 A1 | 1/2005 | Lin | |
| 2006/0005020 A1* | 1/2006 | Hardt | 713/166 |
| 2006/0015932 A1 | 1/2006 | Ballinger et al. | |
| 2006/0015933 A1 | 1/2006 | Ballinger et al. | |
| 2006/0064736 A1 | 3/2006 | Ahuja et al. | |
| 2006/0106938 A1 | 5/2006 | Dini et al. | |

OTHER PUBLICATIONS

Son, Zimmerman, Hansson "An adaptable security manager for real-time transactions", p. 1-8, 2000.

Anita Karve, "SSL and S-HTTP" Jan. 1, 1997; http://www.networkmagazine.com/shared/article/showArticle.jhtml?articleID=17601054.

Dirk Reinshagen, "XML Messaging, Part 2, XML messaging the SOAP way", http://www.javaworld.com/javaworld/jw-06-2001/jw-0622-xmlmessaging2_p.html, 2001.

"The 7 layers of the OSI model", webopedia, http://webopedia.internet.com/quick_ref/OSI_Layers.asp, 2008.

"IBM Tivoli Access Manager for Business Integration Administration Guide" Overview, Version 5.1 SC23-4831-01, http://publib.boulder.ibm.com/trividd/td/ITAMFBI/SC23-4831-01/en_US/HTML/ADM51 . . . , 2003.

"IBM Tivoli Access Manager for Business Integration Administration Guide" Product Concepts, Version 5.1 SC23-4831-01, http://publib.boulder.ibm.com/trividd/td/ITAMFBI/SC23-4831-01/en_US/HTML/ADM51 . . . , 2003.

Reiner Sailer and Matthias Kabatnik "History Based Distributed Filtering—A Tagging Approach to Network-Level Access Control" IEEE (2000) pp. 373-382.

Son et al., "An Adaptable Security Manager for Real-Time Transactions", 2000, Real-Time Systems, 2000. Euromicro RTS 2000. 12th Euromicro Conference.

* cited by examiner

APPARATUS AND SYSTEM FOR ASYMMETRIC SECURITY

CROSS-REFERENCES TO RELATED APPLICATIONS

This application is a continuation of and claims priority to U.S. patent application Ser. No. 10/948,000 entitled "Apparatus, System, and Method for Asymmetric Security" and filed on Sep. 23, 2004 for Pratima Ahuja, et. al, which is incorporated herein by reference.

BACKGROUND OF THE INVENTION

1. Field of the Invention

This invention relates to data communications and more particularly relates to asymmetric security of data communications.

2. Description of the Related Art

Node-to-node security, also referred to as link level security, guarantees that data is secure while being transferred from one node to another within a communication system. Data security can encompass multiple aspects. Two common aspects of data security are integrity and privacy considerations. Integrity security employs a technology, such as digital signatures, to prevent data from being tampered with or forged by an unauthorized party. By using a digital signature, a receiver or destination node may be able to verify the sender's identity and know if the data has been altered or forged. Privacy security employs a technology, such as encryption, to restrict access to sensitive data and, thereby, prevent disclosure to or collection by an unauthorized party. One, both, or neither of these security technologies may be employed for the transmission of data.

A common implementation of link level security is secure socket layer (SSL), which is a transport layer security technology that encrypts data during data transmission between two nodes. Additionally, SSL does not provide end-to-end security for asynchronous communications.

FIG. 1 shows a communication system that includes three nodes. When the source node sends a communication to the destination node, the data may pass through the intermediate node. The communication between the source node and the intermediate node is a synchronous communication because the intermediate node is actively participating in the communication. Once the intermediate node receives the data from the source node, the intermediate node may store the data on a storage device, such as a hard disk drive. The intermediate node subsequently initiates a synchronous communication with the destination node to deliver the data. In this way, the data may be communicated from the source node to the destination node.

By implementing SSL for the data communication, the data is secure during the transmission from the source node to the intermediate node and from the intermediate node to the source node. However, the data is not secure while stored on the electronic storage device or other data retention device on the intermediate node. This insecure storage of the data on the intermediate node provides an opportunity for an unauthorized party to access and potentially tamper with the insecure data. Although SSL provides link level security, it cannot ensure end-to-end security of the data communication. End-to-end security guarantees that data is secure during the entire communication process from the source node to the destination node.

The conventional SSL technology also fails to address the issue of performance on the communication system. By implementing a transport layer security technology such as SSL, the communication system cannot discriminate between data communications that should be protected and those that do not need to be protected. Rather, the communication system simply protects all communications to the extent possible. However, this protection has a very high operating cost due to the time and processing that is required to ensure privacy of the data communications.

Another conventional security technology that was introduced for internet communications is secure hypertext transfer protocol (S-HTTP). S-HTTP, similar to SSL, implements encryption technology to secure the privacy of a data communication. Additionally, although S-HTTP is an application layer security technology, S-HTTP is not widely accepted because it has many disadvantages.

One of the disadvantages of S-HTTP is that it is protocol-specific—it is designed specifically for the HTTP protocol and is not used with any other protocols. Also, S-HTTP does not provide true end-to-end security in a multi-node communication system having intermediate nodes. Rather, S-HTTP is a link level security technology that provides security between an HTTP client and an HTTP server. S-HTTP is also limited, similar to SSL, to synchronous communications because it is a request-response communication protocol. Additionally, S-HTTP also fails to address the performance of the communication system-S-HTTP applies security features to all messages, regardless of the nature of the message.

In additional to the several disadvantages of SSL and S-HTTP listed above, conventional data security technologies operate within symmetric security environments. Symmetric security within data communications refers to sending and receiving messages at the same security levels. For example, within a single communication session either all of the incoming and outgoing messages are encrypted or none of the messages are encrypted. Additionally, when the security features are applied to the data communications, the same security features are applied to all of the data communications, regardless of the need for or usefulness of such security features for some of the non-critical data. In this way, conventional security technologies fail to address the performance of the system for the various messages communicated each way within a communication session.

For example, referring to FIG. 1, the source node may communicate various types of messages (shown by different shapes) to the destination node. Some of these messages may require security in the way of encryption and/or integrity. Other messages may not require security during the transmission to the destination node. Likewise, some of the messages may only require one-way security or, in other words, security when transferred to the destination node but not when transferred from the destination node to the source node. Implementation of one-way security is not possible in a symmetric communication system in which all of the communications between the source node and the destination node are sent at a single security level.

There are overhead costs for generally applying security features to data communications, such as encrypting all data, no matter whether the data is critical or not. In some cases, only data flowing in one direction needs to be secure. In other situations, certain message types may need to be secure while others do not. Still further, some types of messages may need to be secure in one direction and not in the other direction. For example, a client in a client-server system may request some large documents from the server. The server may need some sensitive user information to authenticate the user and, hence, the client request needs to be secure. However, if the response from the server to the client contains large documents that are neither sensitive nor critical, the performance of the server may be improved by not encrypting or otherwise securing the large documents. Unfortunately, symmetric security technologies do not allow for this enhanced performance due to the general application of security features to all data communications.

From the foregoing discussion, it should be apparent that a need exists for an apparatus, system, and method for asymmetric security, in which incoming and outgoing messages may be at different security levels, in order to address the security cost/performance balance of the communication system. Beneficially, such an apparatus, system, and method would additionally allow a security level definition to be dynamically updated during a communication session.

SUMMARY OF THE INVENTION

The several embodiments of the present invention have been developed in response to the present state of the art, and in particular, in response to the problems and needs in the art that have not yet been fully solved by currently available data communication systems. Accordingly, the present invention has been developed to provide an apparatus and system for asymmetric security that overcome many or all of the above-discussed shortcomings in the art.

The apparatus to facilitate asymmetric security is provided with a logic unit containing a plurality of modules configured to functionally execute the necessary operations for asymmetric security. These modules in the described embodiments include a receiving module, a transmission module, a communication module, a detection module, a security module, a definition module, an encryption module, a signature module, and a processing module.

In one embodiment, the receiving module receives a message at the node. The message may be received directly from the source node or from an intermediate node. The detection module, in one embodiment, detects the security level of the message received. The security level of the message may be communicated from the source node with the message or independent of the message. In one embodiment, the security level of the message may be defined in a security level definition.

The security module, in one embodiment, applies security, such as encryption or authentication, to an outgoing message that may be sent from the node to another node. In one embodiment, the security module applies the security to the message at an application layer, as opposed to a transport layer or another layer within a networking framework. The security technology that the security module implements to secure the message may vary depending on the message type or class to which the message belongs. Each message type or class may correspond to a security level with a security level definition.

The transmission module, in one embodiment, communicates the message from the node to another node. The transmission module may facilitate a direct or indirect communication between the nodes. In one embodiment, the message transmitted by the transmission module is associated with the received message. For example, the transmitted message may be a response, a handshaking operation, a request, or another type of data communication between the nodes. Furthermore, the transmission module may communicate the message in either a synchronous or an asynchronous communication system.

The communication module, in one embodiment, communicates the security level of the transmitted message to the receiving node. The communication module may communicate the security level of the message to the source node either by communicating the security level together with the message or independently of the message.

The definition module, in one embodiment, maintains the security level definition, which is descriptive of several potential security levels of the internode messages. The definition module also may dynamically update the security level definition. In one embodiment, the encryption module encrypts the outgoing message at the node according to the security level of the message assigned by the security module. Similarly, the signature module, in one embodiment, digitally signs the internode message at the node according to the security level of the message. The processing module, in one embodiment, processes one or more messages received at the node.

A system of the present invention is also presented to facilitate asymmetric security. The system may be embodied in a single node, in one embodiment, or in a communication system having a plurality of nodes. In particular, the system, in one embodiment, may include an electronic storage device, a security apparatus, and a network interface. The electronic storage device, in one embodiment, stores a security level definition descriptive of a plurality of security levels. The security apparatus, in one embodiment, receives a first message at a first security level from a first node and transmits a second message at a second security level to the first node within a current communication session. The network interface, in one embodiment, communicates the second security level of the second message to the first node.

Another embodiment of the system may include a first node and a second node. The first node, in one embodiment, transmits a first message at a first security level to the second node. The first security level may be descriptive of a first encryption level and/or a first digital signature level. The second node, in one embodiment, receives the first message from the first node and transmits a second message at a second security level to the first node in response to receiving the first message. The second security level may be descriptive of a second encryption level and/or a second digital signature level. In a further embodiment, the system also may include one or more intermediate nodes, such as a broker node.

A signal bearing medium is also presented to store a program that, when executed, performs operations to facilitate asymmetric security. In one embodiment, the operations include receiving a first message at a first security level from a first node, transmitting a second message at a second security level to the first node in response to receiving the first message, and communicating the second security level to the first node. In another embodiment, the operations also may include coupling a security level indicator to the second message, communicating the security level indicator to the first node, detecting the first security level of the first message, processing the first message, and/or applying a security feature to the second message according to the second security level.

In further embodiments, the operations may include defining a security level definition descriptive of the first security level and the second security level, dynamically updating the security level definition during a current communication session, and/or communicating the updated security level definition to the second node during the current communication session. In further embodiments, the operations may include communicating the second message in a synchronous or an asynchronous communication environment, communicating the second security level to the first node during a handshaking operation between the first node and a second node, encrypting the message, and/or digitally signing the message.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
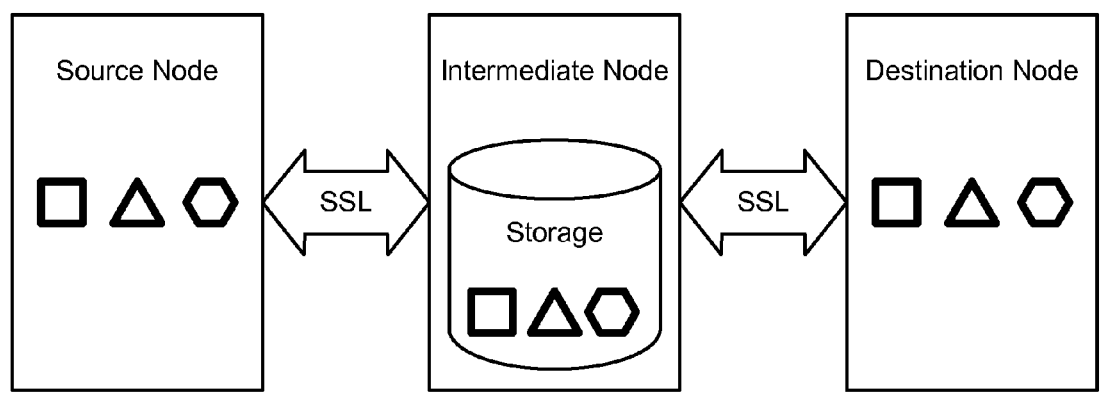
FIG. 1 is a schematic block diagram illustrating a conventional communication system.
Figure 2:
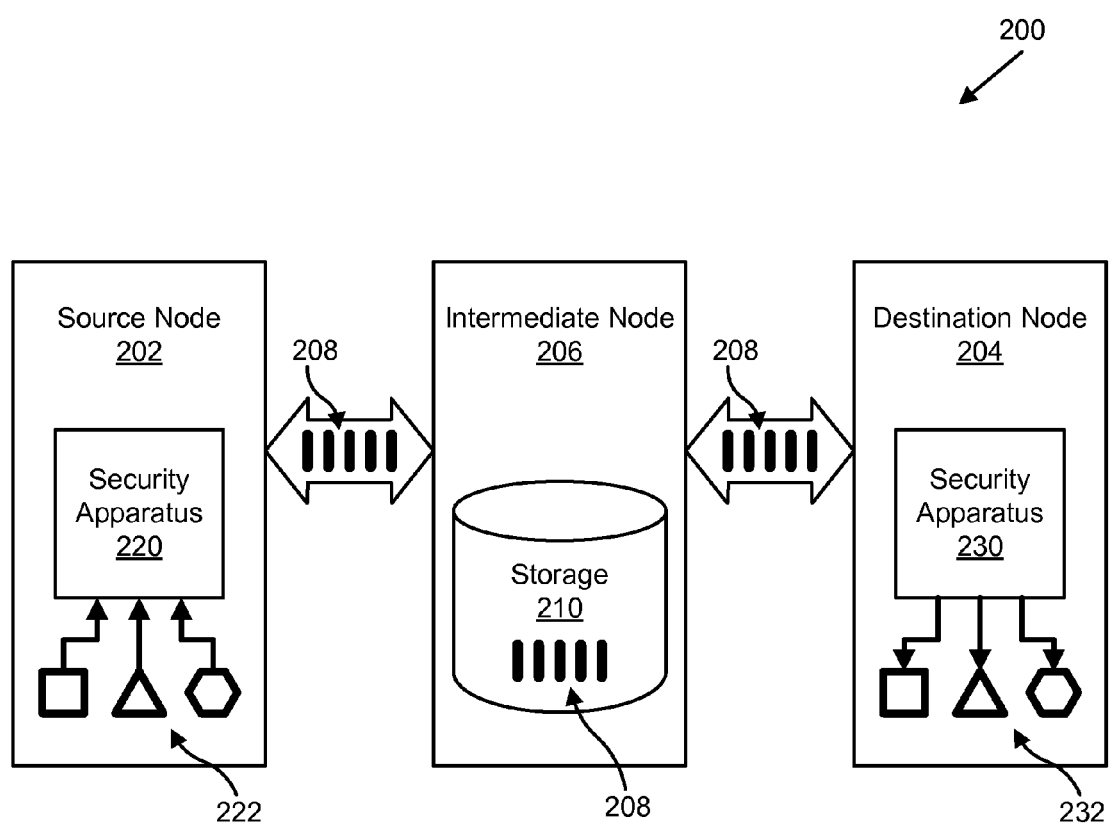
FIG. 2 is a schematic block diagram illustrating one embodiment of communication system for end-to-end security.

FIG. 2 depicts one embodiment of communication system 200 for end-to-end message level security. The illustrated communication system 200 includes a source node 202, a destination node 204, and an intermediate node 206. The source node 202 is configured to send one or more messages 208 to the destination node 204. The source node 202 may communicate the messages 208 to the destination node 204 via the intermediate node 206, as shown, or directly without the intermediate node 206. If the messages 208 are sent via an intermediate node 206, such as a broker, the intermediate node 206 may store the messages 208, at least temporarily, on an electronic storage device 210. In one embodiment, the electronic storage device 210 may be a hard disk drive or another data storage device. Alternatively, the intermediate node 206 may store the messages 208 on an electronic memory device (not shown), such as random access memory (RAM) or another data memory device.

In one embodiment, the messages 208 originate at the source node 202. The source node 202 includes a security apparatus 220 that is described in more detail with reference to FIG. 6. In one embodiment, the security apparatus 220 may be implemented as an application program interface (API) within the source node 202. Generally, the security apparatus 220 identifies a pre-transmission message 222 and may apply one or more security features to the message 222 before transmitting the secure message 208 to the destination node 204. In certain embodiments, the security features may include one or more of the following: encryption, authentication, message integrity, and/or other security features.

In order to provide end-to-end message security and ensure that the message is secure (both privacy and integrity), the security features may be implemented in the application layer that supports application-specific, end-user processes. By applying security to the pre-transmission message 222 at the application layer and transmitting the secure message 208 to the destination node 204, the secure message 208 remains secure throughout the communication. Additionally, the security of the message 208 is preserved even while the message 208 is temporarily stored on the electronic storage device 210 of the intermediate node 206. In this way, the message 208 may be retrieved by the destination node 204 from the intermediate node 206 with the security of the message 208 preserved from the source node 202 all the way to the destination node 204. The security apparatus 230 on the destination node 204 then may authenticate and/or decrypt the secure messages 208 in order to process the received messages 232. As depicted by the various shapes, the pre-transmission messages 222 and the corresponding received messages 232 may be of different types and may require different levels of security during transmission. Additionally, the security level of a particular message may depend on the direction in which the message is being transmitted.

Figure 3:
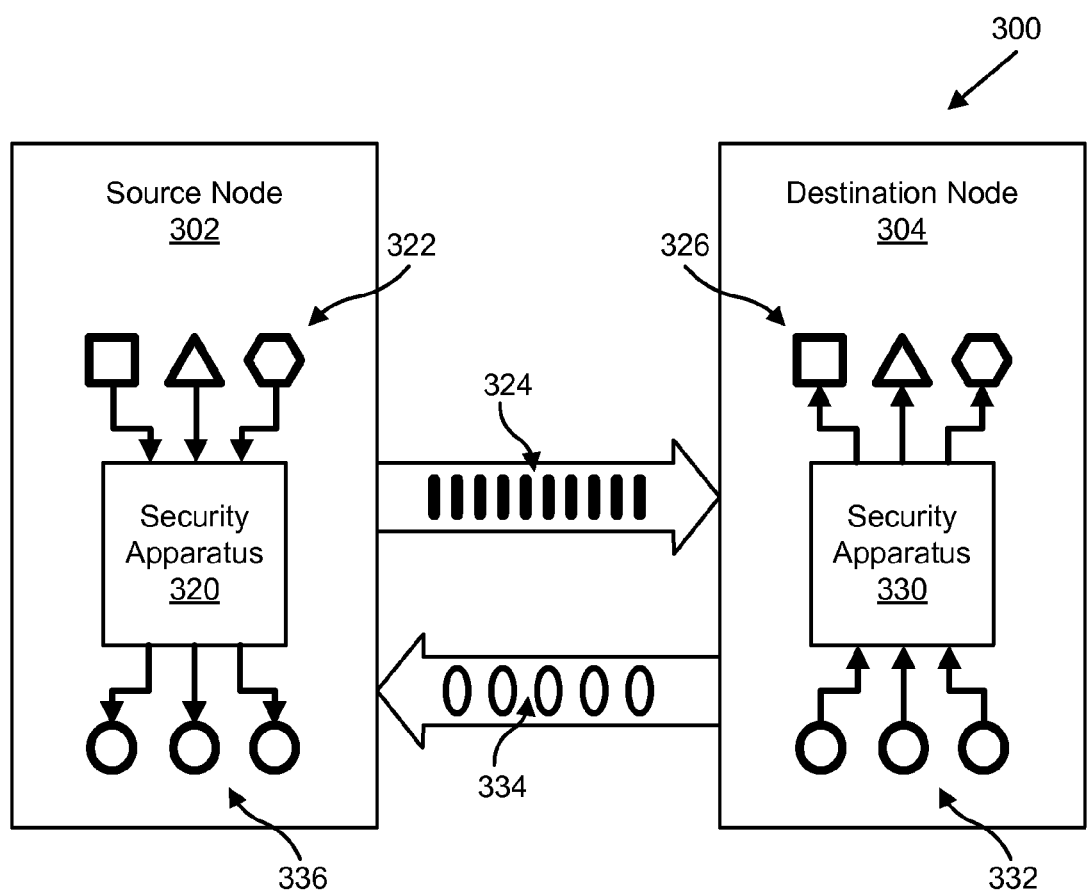
FIG. 3 is a schematic block diagram illustrating one embodiment of a communication system for asymmetric security.

FIG. 3 depicts one embodiment of a communication system 300 for asymmetric security. In addition to asymmetric security, the communication system 300 also may implement end-to-end security as described with reference to FIG. 2. The illustrated communication system 300 for asymmetric security includes a source node 302 and a destination node 304. Although not shown, the communication system 300 also may include one or more intermediate nodes, as described in more detail with reference to FIG. 4.

The source node 302 includes a security apparatus 320 that may apply security to outgoing messages 322 before transmitting secure messages 324 to the destination node 304. The destination node 304 also includes a security apparatus 330 that may be substantially similar to the security apparatus 320 on the source node 302. The security apparatus 330 on the destination node 304 may decode or otherwise use the security features of the secure messages 324 to make the incoming messages 326 usable by the destination node 304.

In contrast to the secure messages 324 transmitted from the source node 302 to the destination node 304, the security apparatus 330 on the destination node 304 may transmit certain outgoing messages 332 as non-secure messages 334 to be received by the source node 302. Once received at the source node 302, the security apparatus 320 may process the incoming messages 336 without performing any security processing. By transmitting the secure messages 324 and non-secure messages 334 in the manner described above—security in one direction, but not in the other direction—the communication system 300 implements asymmetric security.

In another embodiment, the communication system 300 may implement asymmetric security by transmitting non-secure messages 334 in one direction from the source node 302 to the destination node 304 and secure messages 324 from the destination node 304 to the source node 302. In a further embodiment, the communication system 300 may implement asymmetric security by sending messages at one security level in one direction (e.g., source node 302 to destination node 304) and sending messages at a different security level in another direction (e.g., destination node 304 to source node 302). Additionally, the communication system 300 may implement asymmetric security by transmitting messages at various security levels in one direction and transmitting messages at other security levels in the other direction. Not all of the messages sent in one direction need to be at the same security level. Also, some of the messages sent in both directions may be at the same security level and others may be at different security levels.

Figure 4:
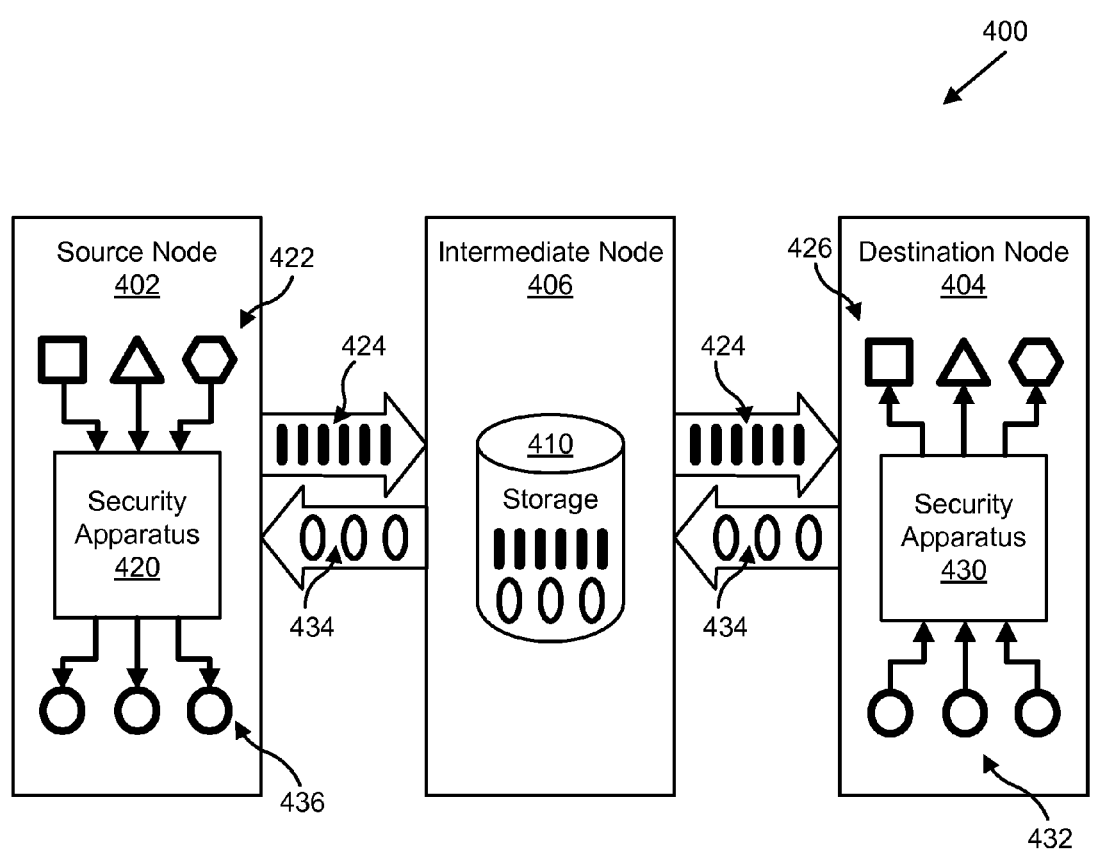
FIG. 4 is a schematic block diagram illustrating another embodiment of a communication system for asymmetric security.

FIG. 4 depicts another embodiment of a communication system 400 for asymmetric security. The illustrated communication system 400 includes a source node 402 and a destination node 404 that may be substantially similar to the source node 302 and destination node 304, respectively, of FIG. 3. Similarly, the security apparatus 420 of the source node 402 and the security apparatus 430 of the destination node 404 may be substantially similar to each other and to the security apparatuses 320, 330 of FIG. 3.

The illustrated communication system 400 also includes an intermediate node 406 through which some or all of the communications between the source node 402 and the communication node 404 may pass. The intermediate node 406 includes an electronic storage device 410 to temporarily store the secure messages 424 and non-secure messages 434, which are substantially similar to the messages described with reference to FIG. 3. Alternatively, the intermediate node 406 may include an electronic memory device or other storage device in place of or in addition to the electronic storage device 410 shown.

Figure 5:
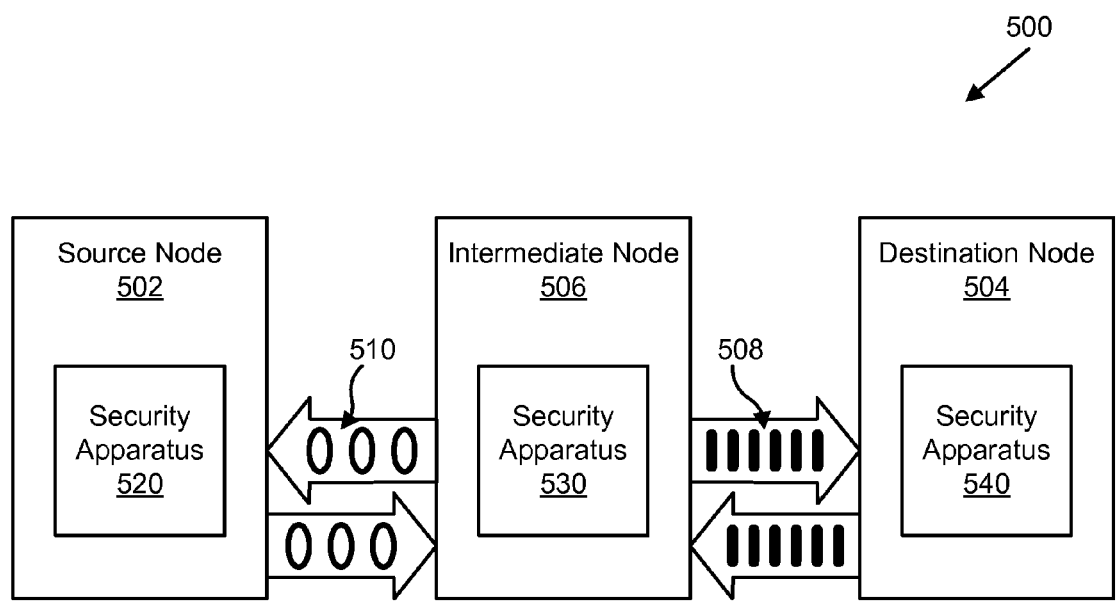
FIG. 5 is a schematic block diagram illustrating another embodiment of a communication system for asymmetric security.

FIG. 5 depicts another embodiment of a communication system 500 that implements a related type of asymmetric security. In particular, the communication system 500 includes a source node 502, a destination node 504, and an intermediate node 506. Each of these nodes 502, 504, 506 includes a corresponding security apparatus 520, 530, 540. In one embodiment, the intermediate node 506 and the destination node 504 communicate secure messages 508 between one another. The intermediate node 506 and the source node 502 may communicate non-secure messages 510 between one another at substantially the same time. In this way, the intermediate node 506 communicates secure messages 508 to the destination node 504 and non-secure messages 510 to the source node 502 at approximately the same time. The origin of the messages from the intermediate node 506 to either the source node 502 or the destination node 504 may be inconsequential in certain embodiments.

Figure 6:
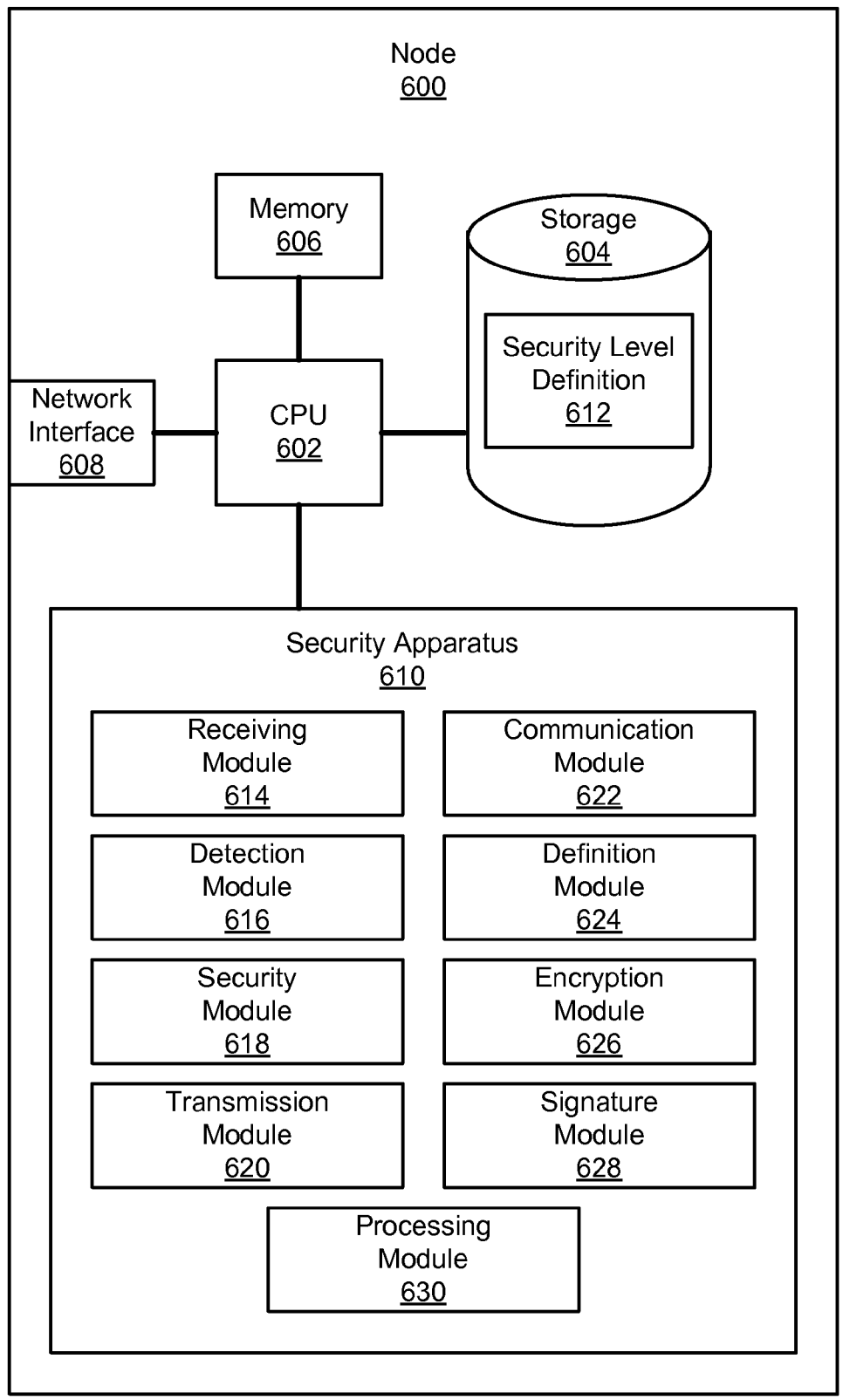
FIG. 6 is a schematic block diagram illustrating one embodiment of a node that may be used for asymmetric security.

FIG. 6 depicts one embodiment of a node 600 that may be used for asymmetric security. In one embodiment, the node 600 may be representative of a source node, a destination node, or an intermediate node. The illustrated node 600 includes a central processing unit (CPU) 602, an electronic storage device 604, an electronic memory device 606, a network interface device 608, and a security apparatus 610.

In one embodiment, the CPU 602 is configured to process data requests, operations, and commands to manage the node 600. The electronic storage device 604 is configured, in one embodiment, to electronically store data that is related to the management and operation of the node 600. In one embodiment, the electronic storage device 604 may be persistent memory or another type of persistent data storage. Similarly, the electronic memory device 606 is configured, in one embodiment, to electronically store data that may be used for management and operation of the node 600 and/or application programs that may be executed on the node 600.

In one embodiment, the electronic storage device 604 may store a security level definition 612. Alternatively, the security level definition 612 may be stored on the electronic memory device 606 or on another data storage device. One example of a security level definition 612 is described in more detail with reference to FIG. 7A.

The network interface device 608 allows communications to occur between the node 600 and other nodes within a communication system. Alternatively, the network interface device 608 may allow communications between, for example, the source node 302 and the destination node 304. For purposes of this description, references to the source node 302 and the destination node 304 are understood to refer to one or more of the source nodes 302, 402, 502 and destination nodes 304, 404, 504, respectively, that are described above with reference to FIGS. 3, 4, and/or 5, unless otherwise noted.

The security apparatus 610, in one embodiment, may be substantially similar to the various security apparatuses depicted in and described with reference to FIGS. 3, 4, and 5. The illustrated security apparatus 610 includes a receiving module 614, a detection module 616, a security module 618, a transmission module 620, and a communication module 622. The illustrated security apparatus 610 also includes a definition module 624, an encryption module 626, a signature module 628, and a processing module 630.

In one embodiment, the receiving module 614 receives a message at the node 600. The message may be from a source node 302 and the node 600 may function in the capacity of a destination node 304. The message may be received directly from the source node 302, in one embodiment, or may be received from an intermediate node, such as the intermediate node 406 of FIG. 4. In an asynchronous communication environment, for example, the node 600 may retrieve the message from a queue on a broker node.

The detection module 616, in one embodiment, detects the security level of the message received at the node 600 by the receiving module 614. The security level of the message may be communicated with the message or independent of the message from the source node 302. In one embodiment, the security level of the message may be defined in the security level definition 612.

The security module 618, in one embodiment, applies security, such as encryption or authentication, to an outgoing message that may be sent from the node 600 to another node. For example, the security module 618 may apply security to an internode message that is communicated or intended to be communicated between two nodes. In one embodiment, the security module 618 applies the security to the message at an application layer, as opposed to a transport layer or another layer within a networking framework. The security technology that the security module 618 implements to secure the message may vary depending on the message type or class to which the message 222 belongs. Each message type or class may correspond to a security level with the security level definition 612.

In one embodiment, the transmission module 620 communicates a message from the node 600 to another node. The transmission module 620 may facilitate a communication that is directly between two nodes or that is communicated via one or more intermediate nodes, such as a broker. In one embodiment, the message transmitted by the transmission module 620 is associated with the received message. For example, the transmitted message may be a response, a handshaking operation, a request, or another type of data communication between the nodes.

Furthermore, the transmission module 620 may communicate the message in either a synchronous or an asynchronous communication system. A synchronous communication environment includes a communication environment that is time-dependent in which data processing relies, at least in part, on the availability of the sending and receiving nodes and/or the network. An asynchronous communication environment includes a communication environment that is time-independent in which data processing does not rely on the availability of the nodes or the network. In other words, asynchronous messaging decouples applications on each of the nodes from each other and from the network.

The communication module 622, in one embodiment, communicates the security level of the transmitted message to the receiving node (originally the source node 302). In other words, after the node 600 receives a first message from the source node 302 and the node 600 sends a corresponding message back to the source node 302, the communication module 622 communicates the security level of the response message to the source node 302.

Similar to above, the communication module 622 may communicate the security level of the response message to the source node 302 either by communicating the security level together with the message or independently of the message. In one example, the communication module 622 may communicate the security level independently of the message by communicating the security level during a handshaking operation between the node 600 and the source node 302 to which the response message is sent. In another example, the communication module 622 may communicate the security level to the source node 302 during a current communication session, in which the messages are sent and received, or similar communication cycle.

In one embodiment, the definition module 624 maintains the security level definition 612 descriptive of the security level of the internode messages. In fact, the security level definition 612 may define a plurality of security levels, as described in more detail with reference to FIG. 7A. In one embodiment, the definition module 624 maintains the security level definition 612 on the electronic storage device 604. Alternatively, the definition module 624 maintains the security level definition 612, or a copy thereof, on the electronic memory device 606 or on another storage or memory device.

The definition module 624 also may maintain other definitions such as a message class definition descriptive of a message type within a message class. The definition module 624 also may maintain a security level map to map the security levels to one or more message types or classes defined within the message class definition.

In one embodiment, the encryption module 626 encrypts the outgoing message at the node 600 according to the security level of the message assigned by the security module 618. Similarly, the signature module 628, in one embodiment, digitally signs the internode message at the node 600 according to the security level of the message. The processing module 630, in one embodiment, processes one or more messages received at the node 600.

Figure 7A:
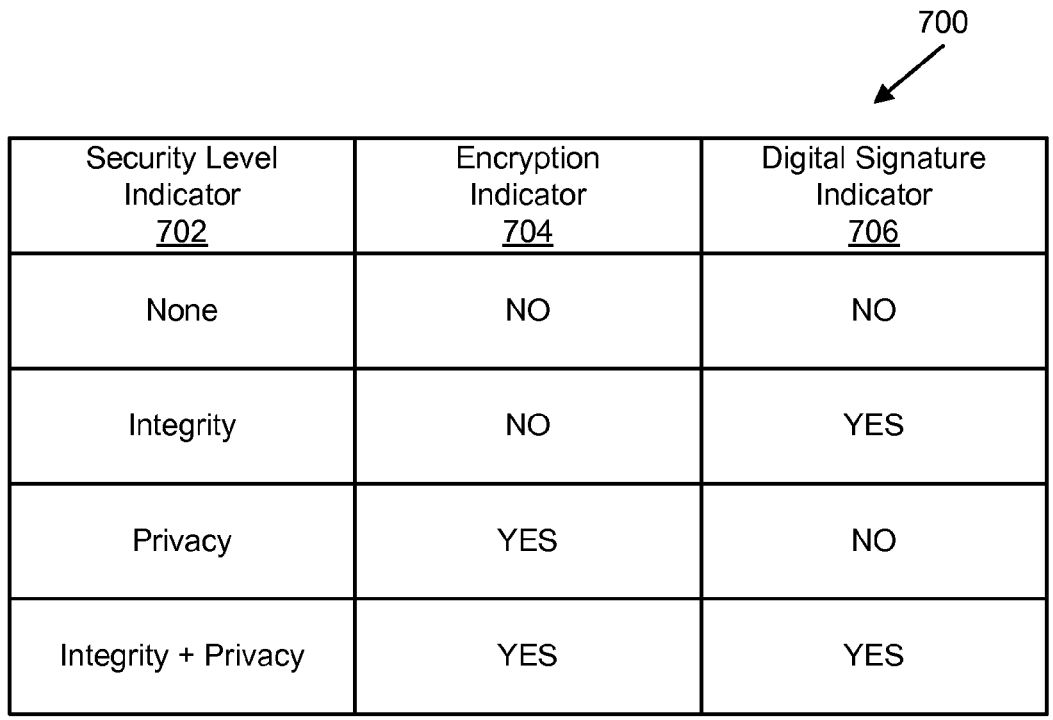
FIG. 7A is a schematic diagram illustrating one embodiment of a security level definition.

FIG. 7A depicts one embodiment of a security level definition 700 that is substantially similar to the security level definition 612 of FIG. 6. In one embodiment, the security level definition 700 defines one or more security levels and, in particular, which security features are to be implemented for each of the security levels. As described above, the security features may include, but are not necessarily limited to, encryption, authentication, and message integrity technologies. In one embodiment, the security level definition 700 may include a security level indicator 702, an encryption indicator 704, and a digital signature indicator 706. For each security level indicated by a security level indicator 702, the corresponding encryption indicator 704 may define whether or not encryption is implemented for the given security level. Similarly, the digital signature indicator 706 may define whether or not a digital signature is implemented for the given security level. Additionally, the encryption indicator 704 and digital signature indicator 706 may define additional parameters, including what type of encryption or digital signature technology, respectively, may be implemented.

In the illustrated example, the security level definition 700 defines four security levels: none, integrity, privacy, and integrity+privacy. In another embodiment, the security level definition 700 may define fewer or more security levels. Additionally, the security level definition 700 may use different security level indicators 702 to identify each security level within the security level definition 700. In the depicted embodiment, the none security level does not implement either encryption or authentication. The integrity security level implements authentication, but does not implement encryption. The privacy security level implements encryption, but does not implement authentication. The integrity+ privacy security level implements both encryption and authentication.

Although the present example is described in terms of four particular security levels, the security levels and various indicators 702, 704, 706 may vary and the security level definition 700 may be modified to adapt to such security levels and to various security technologies. In fact, the definition module 624, in one embodiment, may be configured to dynamically update the security level definition 612 before, after, or during a communication session.

Figure 7B:
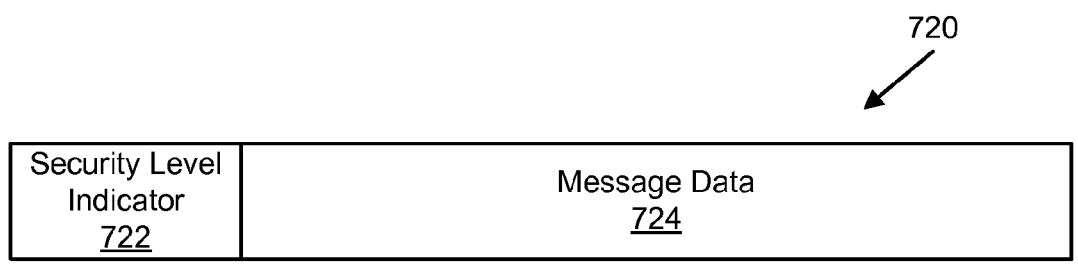
FIG. 7B is a schematic diagram illustrating one embodiment of a message data structure.

FIG. 7B depicts one embodiment of a message data structure 720. The illustrated message data structure includes a security level indicator 722 and message data 724. The message data is the data communicated between the nodes. The security level indicator 722 is descriptive of the security level of the message data 724. In other words, the security level indicator 722 indicates what security features, if any, are applied to the message data 724. In an alternative embodiment, the message data structure 720 may include only the message data 724, in which case the security level indicator 722 may be communicated separately between the nodes. If the security level indicator 722 is communicated separately, a message indicator (not shown) or session indicator (not shown) or another indicator may be attached to the security level indicator 722 in order to indicate the data object or objects that are at the specified security level.

Figure 8:
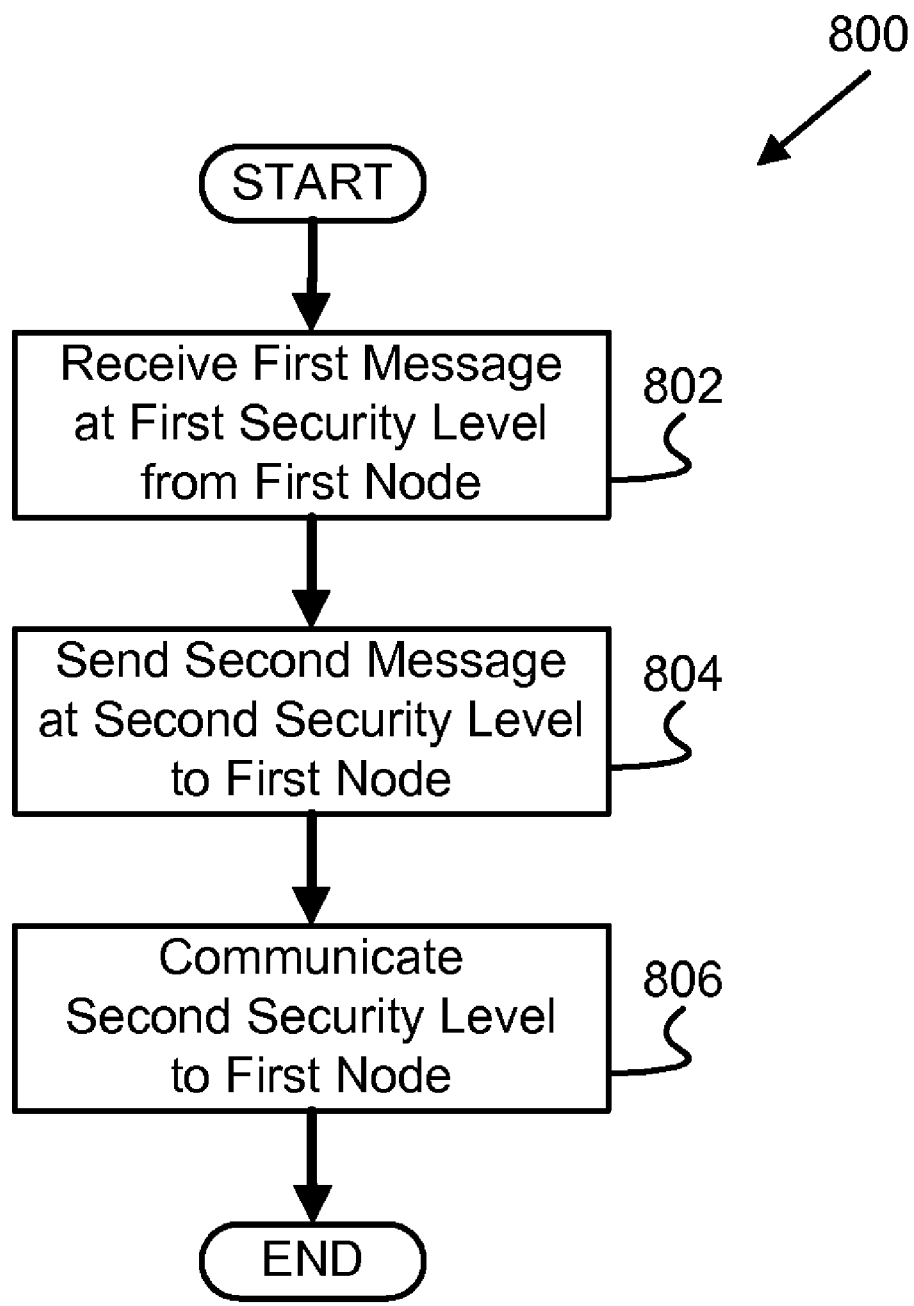
FIG. 8 is a schematic flow chart diagram illustrating one embodiment of a security method that may be implemented on an asymmetric communication system.

FIG. 8 depicts one embodiment of a security method 800 that may used to implement asymmetric security. The security method 800 is described to suggest one embodiment in which certain operations may be performed on certain system components, for example, the source node 302 and/or the destination node 304. However, the separation of operations among various system components, including system components not described, may be facilitated in other manners not shown or described herein. In particular, the security method 800 is described with reference to two nodes referred to as a first node and a second node. The security method 800 is also described in terms of a first message and a second message. In one embodiment, the first message is sent from the first node to the second node. Similarly, the second message is sent from the second node to the first node.

The illustrated security method 800 begins when the second node receives 802 the first message from the first node. The second node may employ the receiving module 614 to receive the first message from the first node. In one embodiment, the first message is at a first security level, which may include encryption, a digital signature, and/or other security features. In one embodiment, the security level of the first message may be communicated by the first node to the second node. For example, the first security level may be communicated with the first message data structure or may be communicated in an independent communication from the first node. Alternatively, the first security level may be determined by the second node according to the message type of the first message and the security level definition 612 on the second node.

In response to receiving the first message, the second node subsequently sends 804 a second message to the first node. In one embodiment, the second node may employ the transmission module 620 to send 804 the second message to the first node. The second message is at a second security level, which may include encryption, a digital signature, and/or other security features. In one embodiment, the second security level is different from the first security level. Additionally, the second message may be sent during the current communication session in which the first message was received.

In addition to sending the second message, the second node also communicates 806 the second security level to the first node. In one embodiment, the second node may employ the communication module 622 to communicate the second security level to the first node. In this way, the first node may be able to verify the authenticity of the second message and decode the second message for processing. In one embodiment, the second node may communicate 806 the second security level to the first node by appending or otherwise coupling a security level indicator to the data of the second message. Alternatively, the second node may communicate the second security level to the first node separately from the second message data. After the second node sends 804 the second message and communicates 806 the second security level to the first node, the depicted security method 800 then ends.

Figure 9:
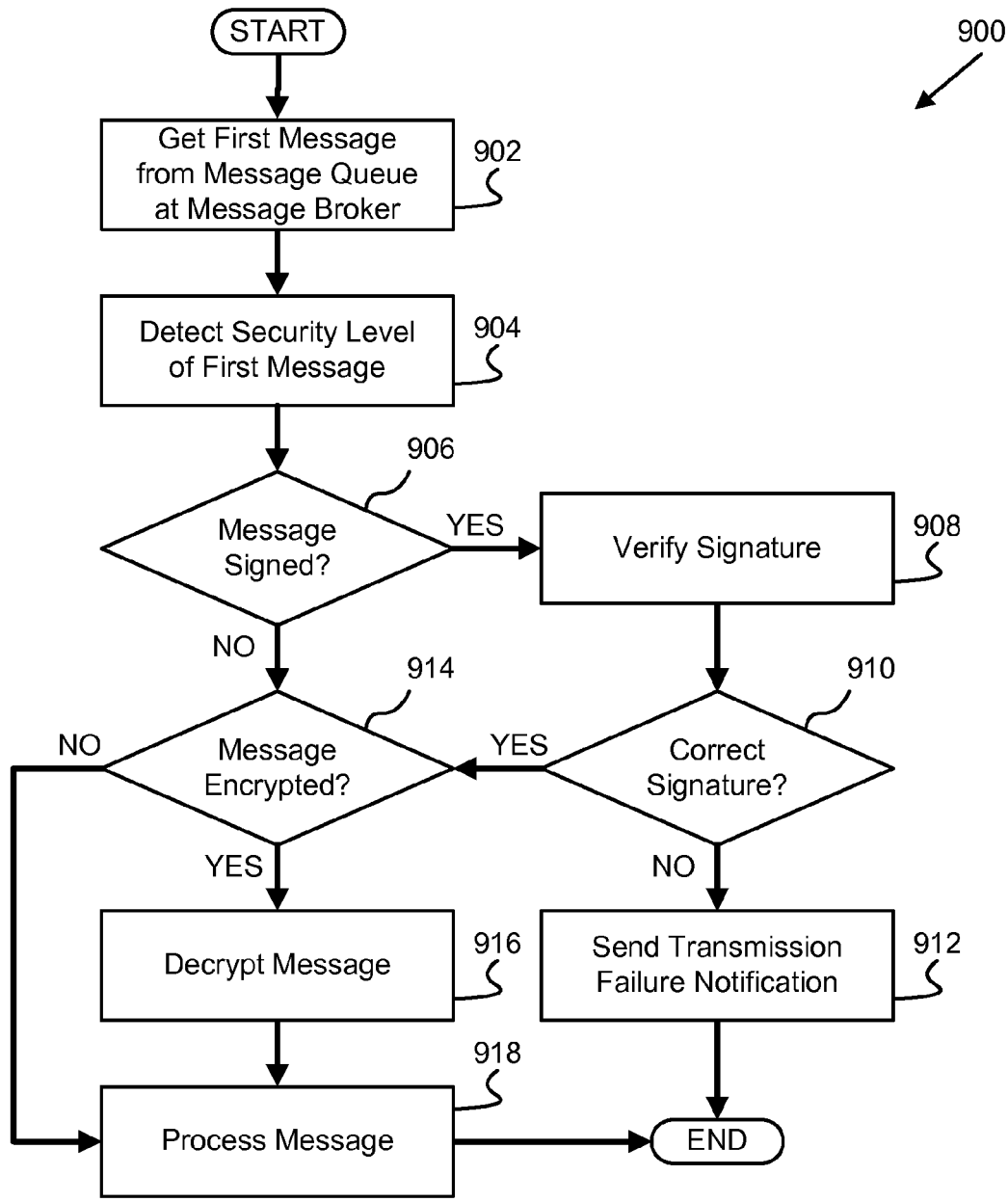
FIG. 9 is a schematic flow chart diagram illustrating one embodiment of a receiving method that may be implemented during the security method of FIG. 8.

FIG. 9 depicts one embodiment of a receiving method 900 that is given by way of example of the receiving operation 802 of the security method 800 of FIG. 8. Specifically, the depicted receiving method 900 begins when the second node gets 902 the first message from a message queue on a message broker (intermediate node). In alternative embodiments, the second node may directly receive the first message from the first node or receive the first message in another manner. The second node then detects 904 the first security level of the first message. The first security level may be defined by a security level indicator received with or independent of the first message data, as described above.

If the second node determines 906 that the first node implemented a digital signature on the first message then the second node may verify 908 the digital signature and determine 910 if the signature is correct. If the signature is not correct, then the second node may send 912 a transmission failure notification to the first node to indicate the failure of the transmission. If the first message is not signed or if the digital signature is correct, the second node then determines 914 if the first message is encrypted and, if so, decrypts 916 the first message. After the first message is decrypted 916, or if the first message was not encrypted, the second node may process 918 the first message. The depicted security method 900 then ends.

Figure 10:
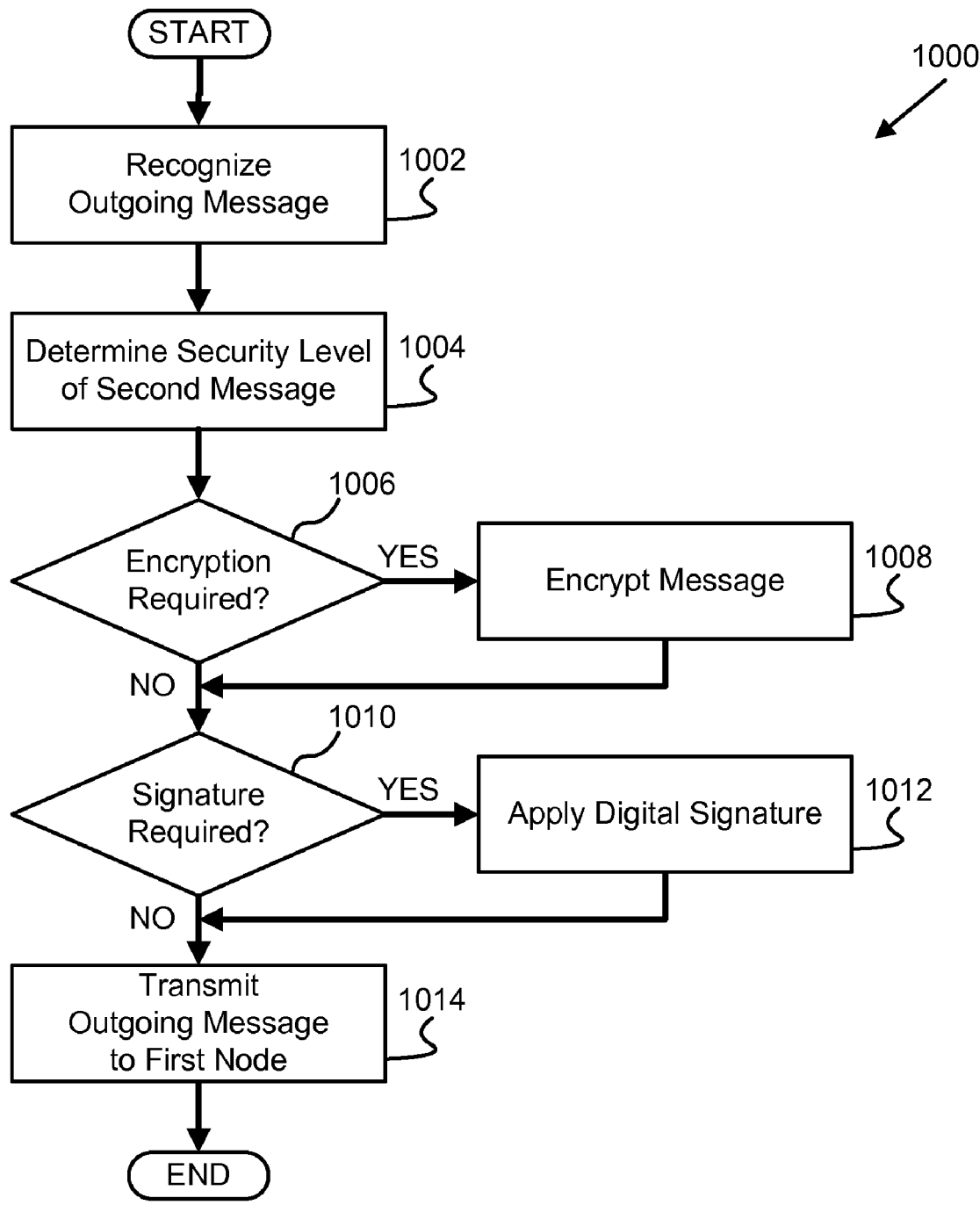
FIG. 10 is a schematic flow chart diagram illustrating one embodiment of a transmission method that may be implemented during the security method of FIG. 8.

FIG. 10 depicts one embodiment of a transmission method 1000 that is given by way of example of the transmission operation 804 of the security method 800 of FIG. 8. The depicted transmission method 1000 begins when the second node recognizes 1002 a second message to be transmitted to the first node. In one embodiment, the second message is related to the first message received by the second node. The second node then determines 1004 the security level of the second message. In one embodiment, the second node may employ the security module 618 to determine 1004 the second security level of the second message by referencing a security level map and/or the security level definition 612. The second node also may determine the security actions to be applied to the second message as defined by the security level definition 612.

In one embodiment, the second node determines 1006 if privacy security features should be implemented according to the security level definition 612. If so, the encryption module 626 encrypts 1008 the second message. The second node also determines 1010 if integrity security features should be implemented according to the security level definition 612. If so, the second node digitally signs 1012 the second message.

The second node then transmits 1014 the second message to the first node and the depicted transmission method 10 then ends.

The schematic flow chart diagrams included herein are generally set forth as logical flow chart diagrams. As such, the depicted order and labeled operations are indicative of one embodiment of the presented method. Other operations and methods may be conceived that are equivalent in function, logic, or effect to one or more operations, or portions thereof, of the illustrated method. Additionally, the format and symbols employed are provided to explain the logical operations of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated operations of the depicted method. Additionally, the order in which a particular method occurs may or may not strictly adhere to the order of the corresponding operations shown.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to facilitate asymmetric security, the apparatus comprising:
   a storage device storing executable code;
   a processor executing the executable code, the executable code performing operations comprising:
   receiving a first message at a first security level from a first node, the first security level selected from a plurality of available security levels in accordance with a sensitivity level of the first message;
   transmitting a second message at a second security level to the first node in response to receiving the first message, the second security level selected from the plurality of available security levels in accordance with a sensitivity level of the second message;
   wherein each of the plurality of available security levels are defined in a dynamically updateable security level definition, the dynamically updateable security level definition indicating security features dynamically applicable to each security level; and
   communicating the second security level to-the first node.

2. The apparatus of claim 1, the operations further communicating the second security level to the first node by a security level indicator coupled to the second message.

3. The apparatus of claim 1, the operations further communicating the second security level to the first node during a handshaking operation between the first node and a second node.

4. The apparatus of claim 1, the operations further detecting the first security level of the first message.

5. The apparatus of claim 1, the operations further processing the first message.

6. The apparatus of claim 1, the operations further applying the security features to the second message according to the second security level.

7. The apparatus of claim 6, the operations further encrypting the second message.

8. The apparatus of claim 6, the operations further digitally signing the second message.

9. The apparatus of claim 1, the operations further defining the security level definition descriptive of the first security level and the second security level.

10. The apparatus of claim 9, the operations further dynamically updating the security level definition during a current communication session.

11. A system to facilitate asymmetric security, the system comprising:
    a first node configured to transmit a first message at a first security level, the first security level descriptive of a first encryption level and a first digital signature level, the first security level selected from a plurality of available security levels in accordance with a sensitivity level of the first message;
    a second node configured to receive the first message from the first node and to transmit a second message at a second security level to the first node in response to receiving the first message, the second security level descriptive of a second encryption level and a second digital signature level, the second security level selected from the plurality of available security levels in accordance with a sensitivity level of the second message;
    wherein each of the plurality of available security levels are defined in a dynamically updateable security level definition, the dynamically updateable security level definition indicating security features dynamically applicable to each security level; and
    wherein the first node and the second node each comprise a storage device storing executable code and a processor executing the executable code.

12. The system of claim 11, further comprising an intermediate node coupled between the first node and the second node, the intermediate node configured to receive the first message from the first node and transmit the first message to the second node, the intermediate node further configured to receive the second message from the second node and transmit the second message to the first node.

13. A memory device embodying a program of machine-readable instructions executed by a digital processing apparatus to perform operations to facilitate asymmetric security, the operations comprising:

receiving a first message at a first security level from a first node, the first security level selected from a plurality of available security levels in accordance with a sensitivity level of the first message;

transmitting a second message at a second security level to the first node in response to receiving the first message, the second security level selected from the plurality of available security levels in accordance with a sensitivity level of the second message;

wherein each of the plurality of available security levels are defined in a dynamically updateable security level definition, the dynamically updateable security level definition indicating security features dynamically applicable to each security level; and communicating a security level indicator to the first node, the security level indicator indicating the second security level.

14. The memory device of claim 13, wherein the instructions further comprise an operation to couple the security level indicator to the second message.

15. The memory device of claim 13, wherein the instructions further comprise an operation to communicate the second security level to the first node during a handshaking operation between the first node and a second node.

16. The memory device of claim 13, wherein the instructions further comprise an operation to detect the first security level of the first message.

17. The memory device of claim 13, wherein the instructions further comprise an operation to dynamically update the security level definition for the first message during a current communication session.

18. The memory device of claim 17, wherein the instructions further comprise an operation to communicate the updated security level definition to the first node during the current communication session.

19. The memory device of claim 13, wherein the instructions further comprise an operation to communicate the second message in a synchronous communication environment.

20. The memory device of claim 13, wherein the instructions further comprise an operation to communicate the second message in an asynchronous communication environment.

* * * * *